United States Patent
Fleury

[15] 3,656,299
[45] Apr. 18, 1972

[54] HYDROSTATIC TRANSMISSIONS
[72] Inventor: Jacques Fleury, Paris, France
[73] Assignee: Societe Anonyme Automobiles Citroen, Paris, France
[22] Filed: Oct. 2, 1970
[21] Appl. No.: 77,403

[30] Foreign Application Priority Data
Oct. 17, 1969 France ................................. 6935754

[52] U.S. Cl. ..................................... 60/53 A, 60/51, 91/499
[51] Int. Cl. ......................................... F16d 31/02, F15b 1/02
[58] Field of Search ..................................... 60/53 A; 91/499

[56] References Cited
UNITED STATES PATENTS
2,452,470 10/1948 Johnson ........................... 60/53 A X
3,036,434 5/1962 Mark .................................. 60/53 A X
3,161,023 12/1964 Margolin et al. .................... 60/53 A X Primary Examiner—Edgar W. Geoghegan
Attorney—Wenderoth, Lind & Ponack

[57] ABSTRACT

This hydrostatic transmission comprising a hydrostatic machine normally operating as a generator and at least one hydrostatic machine normally operating as a receiver or load apparatus, these machines being of the barrel-cylinder type comprising distributor plates formed with ports inter-connected by high-pressure and low-pressure duct means, is characterized in that at least one of said distributor plates comprises an auxiliary port connected via an auxiliary circuit to a fluid reservoir through the medium of a non-return valve.

11 Claims, 6 Drawing Figures

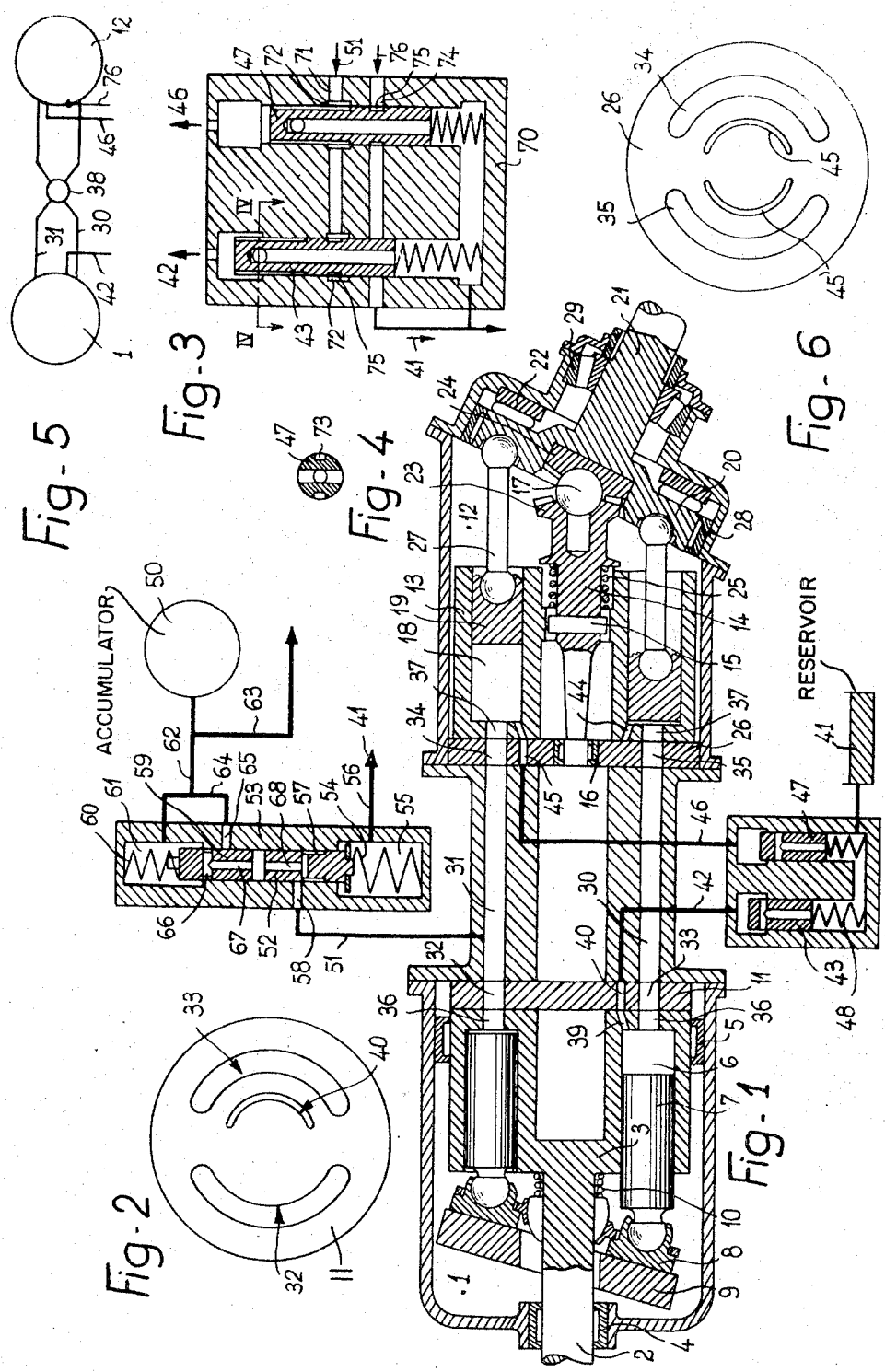
JACQUES FLEURY, Inventor
By Wenderoth, Lind & Ponack
Attorneys

HYDROSTATIC TRANSMISSIONS

The present invention relates in general to hydrostatic transmissions and has specific reference to transmissions of this character comprising a generator and at least one receiver or load apparatus interconnected by pipe lines constituting a closed circuit.

In installations of this type the fluid leakages must be compensated. To this end, the simplest solution consists in causing the generator to suck up the whole of its output from a reservoir into which the fluid is forced by the receiver or load apparatus. However, this arrangement is objectionable in that it precludes any reversibility in the operation of the installation; moreover, it is attended by the possibility of detrimental cavitation in the suction line at high output values, and finally it tends to emulsionize the fluid in the reservoir, so that considerable volumes of fluid must be contemplated.

A known attempt to avoid these inconveniences consisted in associating with the transmission an auxiliary pump for compensating the leakages of the assembly through a pair of non-return valves and preventing any cavitation. In this case, the generator and receiver are connected directly through a pair of pipe lines and a duct connected to said auxiliary pump via one of the non-return valves opens into the corresponding pipe line. However, due to the mechanical driving system generally employed in this case the output is subordinate essentially to the speed of the engine or motor driving the generator and must compensate or make up the highest leakage when the engine or motor revolves at low speed. As a consequence, pumps of this type are generally oversized and at high speeds there is a waste of energy which causes an undesired overheating of the fluid.

On the other hand, this pump is operated in most instances as a source of pressure for controlling or supplying servo-action systems; therefore, when the volume of leakage fluid increases as a consequence of wear and tear, these servo means may suddenly become inoperative.

It is the first object of this invention to provide a hydrostatic transmission adapted to avoid the inconveniences characterizing the two systems mentioned hereinabove, to eliminate the auxiliary pump, and to compensate fluid leakages in both forward and reverse operating conditions (the generator being adapted to operate as a pump, if desired) assuming that the transmission is used for driving a vehicle, and also to operate all servo means associated therewith.

More particularly, this invention is concerned with a hydrostatic transmission comprising a hydrostatic machine operating most frequently as a generator and at least one hydrostatic machine operating most frequently as a receiver or load apparatus. These machines, of the cylinder barrel type, comprising a plurality of parallel pistons movable in a cylinder block or barrel and reacting against a swash plate, are inter-connected in closed-circuit conditions through high-pressure and low-pressure pipe lines. The distributor plates are formed with ports, with pipe lines leading into such ports. The transmission is characterized in that at least one of the distributor plates comprises an auxiliary port concentric to the axis of the cylinder block. The wall of this cylinder block has orifices opening on the one side into each cylinder and on the other side on the face contacting the distributor plate, at the same radial distance as the auxiliary port. The auxiliary port is connected to a fluid reservoir via an auxiliary circuit in which a non-return valve is interposed. Thus, an auxiliary duct is available from which each piston, during the suction stroke, can draw freely hydraulic fluid from a reservoir and in a quantity just sufficient for completing the losses of fluid in the system while avoiding the passage of the entire output through the reservoir or the necessity of providing an additional pump.

In order to afford a clearer understanding of this invention reference will now be made to the attached drawings illustrating diagrammatically by way of example typical forms of embodiment thereof. In the drawings:

FIG. 1 is a diagrammatic sectional and elevational view of a transmission according to this invention;

FIG. 2 is a front view of the distributor plate associated with the generator of FIG. 1;

FIG. 3 is a diagrammatic elevational and sectional view of a modified form of embodiment of the valve device adapted to supply pressure fluid to the servo-action devices and to compensate fluid leakages in either direction of operation, each machine being adapted to operate independently as a generator or as a pump;

FIG. 4 is a detail view showing a valve member of the valve device of FIG. 3;

FIG. 5 is a diagrammatic view showing the mode of operation of the assembly in the case of a system incorporating a reversing valve, and FIG. 6 is a front view of the distributor plate of the receiver in the case illustrated in FIG. 5.

In the exemplary form of embodiment illustrated in FIG. 1 the generator 1 comprises a cylinder block or barrel 3 driven from a shaft 2 and pivotally mounted in bearings 4 and 5; this barrel 3 has formed therein parallel cylinder bores 6 equally spaced from the axis of rotation of the barrel and having slidably mounted therein corresponding pistons 7 guided through sockets 8 by an inclined and fixed swash plate 9. A spring 10 constantly urges the sockets 8 against the swash plate 9 and reacts against the barrel so as to resiliently urge the latter against the distributor plate 11. This generator is adapted to drive a receiver or load apparatus 12 comprising a cylinder barrel or block 13 similar to barrel 3 and mounted on a shaft 14 to which it is rigidly connected by means of a diametrical lock pin 15. This shaft 14 is rotatably mounted between a bearing 16 and a ball 17. In the parallel cylinder bores 18 of barrel 13 corresponding pistons 19 are slidably mounted responsive to the action of the fluid under pressure from the generator, whereby these pistons 19 are caused rotatably to drive the inclined swash plate 20 mounted on the driven shaft 21 receiving said ball 17 in a suitable axial socket. An axial bearing 22 receives the piston thrusts. The synchronism between the rotation of the barrel mounted on shaft 14 and the plate 20 is obtained by means of a pair of bevel pinions 23, 24. A spring 25 constantly urges on the one hand the barrel 13 against a distributor plate 26 and on the other hand the bevel pinions 23, 24 in proper meshing engagement.

Connectors 27 formed with crimped ball-shaped ends are interposed between the swash plate 20 and the pistons 19, so as to drive said plate from said pistons.

The generator 1 communicates with the receiver 12 through ducts 30, 31 interconnecting the ports 32, 33 of the fixed distributor plate 11 of the generator and the ports 34, 35 of the fixed distributor plate 26 of the receiver, end orifices 36 and 37 being formed in the bottom of blocks 3 and 13, respectively.

In the commonest mode of operation the generator 1 driven from shaft 2 delivers fluid under pressure utilized in the receiver 12 for rotatably driving the driven shaft 21, the fluid circulating via duct 31, from the outlet port 32 of distributor plate 11 to the inlet port 34 of plate 26, the expanded or low-pressure fluid flowing back via duct 30, from the port 35 of plate 26 to the inlet port 33 of plate 11.

Of course, the operation described hereinabove may be reversed, the generator operating as a receiver, and vice versa; this being observed notably in case the device is mounted on a vehicle for driving the drive wheels thereof, so that when coasting the wheels drive the motor which acts as a brake. Similarly, the direction of rotation may be inverted, for example by providing a reversing valve 38 (FIG. 5) for crossing the ducts 30 and 31 when it is desired to obtain the reverse.

Of course, in an arrangement of this character some means must be provided for compensating the losses of fluid produced in machines of this character.

According to the present invention, a second orifice 39 is formed through the bottom of each cylinder of said generator and during the suction stroke of the corresponding generator piston, said orifice 39 communicates with an auxiliary port 40 formed through the distributor plate. This port 40 is connected to the reservoir 41 via a pipe line 42 and a non-return valve 43 adapted to seal the pipe line when the fluid pressure is reversed.

Similarly, the bottom of each receiver cylinder has a second orifice 44 formed therethrough which, during the suction stroke of the relevant piston, communicates with an auxiliary port 45 formed in the distributor plate 26 and connected to the reservoir via another pipe line 46 comprising a non-return valve 47.

This device operates as follows:

When the high pressure prevails in duct 31, valve 47 is depressed, thus preventing any passage of fluid towards the reservoir 41.

The fluid output forced from the receiver to the generator is lower than the fluid output sucked in by the generator, the difference corresponding to the sum of the external leakages of the receiver and generator; under these conditions, a vacuum is created in one cylinder 6 being filled, thus permitting the ingress of a volume of compensating fluid from the reservoir 41 and through the valve 43 constantly urged to its open position by a spring 48, in order to compensate the loss of pressure of the compensation output through circuit 43, 42, 40, 39, 32 and 31.

When the system is reversed, i.e. when the generator operates as a receiver and vice versa, the fluid flow is through circuit 47, 46, 45 and 44.

To replace the source of pressure generally provided for operating the servo means it is possible to divert fluid from the generally high-pressure duct 31 and direct this diverted-high-pressure fluid towards an accumulator 50 via a circuit 51 and a pressure stabilizing valve 52. This valve 52 slidably mounted in a body 53 is responsive to the action of a gauge spring 54 enclosed in an end chamber 55 connected via a pipe line 56 to the reservoir 41. This valve member 52 has formed therein a longitudinal groove 57 co-acting with a port 58 receiving one end of said circuit 51; a non-return valve 59 urged by a spring 60 is disposed in a chamber 61 communicating with the pressure built up in said accumulator 50 via a pipe line 62 having a branch line 63 directed to the servo means, another branch line 64 of pipe line 62 opening into another port 65.

Thus, when an accidental overpressure is produced in the accumulator circuit the valve 59 is lowered, thus compressing the spring 54 and causing the port 65 to communicate with a groove 66 communicating in turn with the axial passage 67; then the fluid pressure forces the valve member 52 back and the fluid flows through port 68 and groove 57 towards chamber 55 and reservoir 41.

When on the other hand the pressure drops in the accumulator 50 the gauging spring 54 becomes preponderant and the pressure regulator 52 connects the port 58 with groove 57, passages 68 and 67, and groove 66, and eventually chamber 61 after a sufficient upward movement of valve member 52; under these conditions, valve member 59 acts as a non-return valve between accumulator 50 and circuit 51.

Furthermore, the pressure necessary for operating the servo means may be derived directly from the transmission, without, providing a special pump for this purpose.

According to a modified form of embodiment illustrated in FIG. 3, the circuits leading to the servo means (not shown) may be supplied directly if at least one of the circuits 42 and or 46 is connected to the high-pressure source.

To this end, the non-return valve unit 43, 47 of FIG. 1 is used. The valve members thereof are mounted in a body 70 comprising a radial passage 71 interconnecting chambers 72 in which the valve members 43, 47 are fitted; these valve members 43, 47 are formed with longitudinal grooves 73 (FIG. 4) adapted to provide a fluid connection between the valve head and the corresponding chamber 72 when the circuit in which said valve member is inserted is exposed to a high fluid pressure and in this case the valve member is depressed as shown in the right-hand portion of the Figure.

The radial passage 71 is connected to a pipe line leading to the accumulator. Thus, the duct under pressure is connected automatically to the accumulator, whether one or the other of said ducts 30 or 31 is concerned.

However, when the generator is expected to drive the receiver in one or the other direction, by controlling a reversing valve 38 adapted to cross the circuits 30 and 31 (FIG. 5), the pair of valves 43 and 47 are simultaneously open, but this is not detrimental. However, in case of reversal of the direction of motion, and in case of reversal of the generator-receiver function of the machines, these two valves are simultaneously closed. To compensate fluid leakages in this case, a second auxiliary port 45' is provided through the distributor plate 26 which is disposed symmetrically to the first auxiliary port 45 (FIG. 6) and said second auxiliary port is connected via a pipe line 76 to a passage 74 connected on the other hand to the reservoir 41, the valves being formed with necked or narrower portions 75 so that when they are closed they interconnect the two ends of passage 74.

Although this invention is described hereinabove with reference to its application to hydrostatic machines of the cylindrical barrel type, with a flat, part-spherical or tapered distributor plate, it will be readily understood by those skilled in the art that this invention is applicable as well and without any further modification to hydrostatic machines having radial cylinders; in this case the distributing surface is cylindrical, and the auxiliary port covers an arc along a circular section of the distributor.

Besides, various changes and variations may be brought to the specific forms of embodiment described, illustrated and suggested herein, without departing from the basic principles of the invention as set forth in the appended claims.

What is claimed as new is:

1. A hydrostatic transmission comprising at least one generating hydrostatic machine and one receiving hydrostatic machine, said machines each comprising a cylinder block having a wall with orifices, a plurality of cylinders with pistons slidably mounted in said block and bearing against a guide surface, said machines being connected in closed-circuit relationship via high-pressure and low-pressure ducts and through distributor plates formed with ports into which pipe lines are caused to open, characterized in that at least one of said distributor plates is formed with an auxiliary port connected to a fluid reservoir via an auxiliary circuit having a non-return valve inserted therein, said auxiliary port co-acting with said orifices in the wall of said cylinder block and opening on the one hand into each cylinder, respectively, and on the other hand into the surface contacting the distributor plate in the area thereof corresponding to the radial position of said auxiliary port.

2. Hydrostatic transmission according to claim 1, wherein at least one of said machines is of the type comprising a cylindrical barrel, the auxiliary port formed in said distributor plate being concentric to the barrel axis, and said orifices are formed in the wall of said cylinder barrel in the area thereof corresponding to the radial position of said auxiliary port.

3. Hydrostatic transmission according to claim 2, wherein at least one of said machines is of the radial-cylindered type, the distributor surface being cylindrical in this case and the auxiliary port extends along an arc of a circular section of said distributor.

4. Hydrostatic transmission according to claim 1, wherein each machine comprises an auxiliary port and co-acting orifices.

5. Hydrostatic transmission according to claim 1, wherein a reversing control device is provided between the high-pressure and low-pressure ducts in order to permit the reversal of the direction of rotation of the receiving member by simply switching the direction of feed of the pressure fluid.

6. Hydrostatic transmission according to claim 1, in which means are provided for supplying pressure fluid to servo means, whereby high-pressure fluid can be diverted via a pipe line connecting the duct usually under high pressure to an accumulator and comprising a non-return valve.

7. Hydrostatic transmission according to claim 6, wherein the pressure fluid diverting line comprises a pressure-reducing and regulating valve.

8. A hydrostatic transmission as set forth in claim 7, wherein said non-return valve and said pressure-reducing and regulating valve are disposed in series in a common bore and urged towards each other by suitable spring means.

9. A hydrostatic transmission as set forth in claim 6, wherein the pipe line for diverting fluid under pressure communicates with either of said high-pressure and low-pressure ducts via non-return valves.

10. Hydrostatic transmission as set forth in claim 9, wherein said non-return valves are those of the auxiliary circuits mentioned in claim 1.

11. Hydrostatic transmission as set forth in claim 4, wherein the distributor plate of said receiver comprises a second auxiliary port connected via a pipe line to said reservoir so as to communicate therewith when said valves are closed, to permit the compensation of fluid leakages.

* * * * *